United States Patent [19]
Greenwood

[11] Patent Number: 5,938,557
[45] Date of Patent: Aug. 17, 1999

[54] CVT CONTROL SYSTEM

[75] Inventor: Christopher John Greenwood, Preston, United Kingdom

[73] Assignee: Torotrak (Development) Limited, Lancashire, United Kingdom

[21] Appl. No.: 09/166,866

[22] Filed: Oct. 6, 1998

Related U.S. Application Data

[63] Continuation of application No. PCT/GB97/00956, Apr. 4, 1997.

[30] Foreign Application Priority Data

Apr. 19, 1996 [GB] United Kingdom .................. 9608147

[51] Int. Cl.⁶ .............................. F16H 61/38; F16H 37/00
[52] U.S. Cl. ............................................................ 475/216
[58] Field of Search ..................................... 475/114, 115, 475/216

[56] References Cited

U.S. PATENT DOCUMENTS

| | | | |
|---|---|---|---|
| 3,406,597 | 10/1968 | Perry et al. ................................ | 74/865 |
| 4,997,412 | 3/1991 | Reed ......................................... | 475/24 |
| 5,090,951 | 2/1992 | Greenwood .............................. | 475/216 |

FOREIGN PATENT DOCUMENTS

| | | |
|---|---|---|
| 0 356 102 A1 | 2/1990 | European Pat. Off. . |
| 0 479 737 A1 | 4/1992 | European Pat. Off. . |
| 0 507 329 A2 | 10/1992 | European Pat. Off. . |
| 90/05860 | 5/1990 | WIPO . |

*Primary Examiner*—Dirk Wright
*Attorney, Agent, or Firm*—Davis and Bujold

[57] ABSTRACT

A hydraulic control system (70) for a multi-regime CVT (8) includes regime-change clutches (37, 38) which are controlled independently of the variator (10) so that a smooth change of regime may be effected.

15 Claims, 4 Drawing Sheets

CVT CONTROL SYSTEM

This application is a continuation of PCT/GB97/00956 filed Apr. 4, 1997.

The present invention relates to continuously-variable-ratio transmissions (CVTs) e.g. for use in an engine-driven vehicle, and to hydraulic control systems for such CVTs.

Transmissions are known which use a variator of the toroidal-race rolling-traction type to give the continuously-variable-ratio performance and clutches to move the transmission between one or other of two operating regimes.

Typically, such clutches are designed with interleaving friction plates actuated by hydraulic pistons. To avoid excessive drag when disengaged, the plates are positively separated by 'push off' springs incorporated in the clutch.

When the low regime clutch is engaged, e.g. for neutral, reverse and low forward speeds of the vehicle, the drive from the variator to the transmission output shaft is via a mixing epicyclic gear set in which the planet carrier is driven by the input shaft, the variator output disc drives the sun, and the epicyclic annulus is connected with the transmission output shaft.

With the rollers set at their highest speed ratio positions, the influence of the sun wheel dominates to drive the transmission output shaft in reverse. As the rollers move away from this position, they pass through a "geared neutral" setting in which the equal and opposite effects of the sun and the planet carrier cancel one another out to give a zero drive effect. Thereafter, as the rollers move to operate the variator at a progressively lower speed ratio, the forward drive from the planet carrier dominates to an increasing extent. Thus when the variator ratio reaches its lower limit (i.e. minimum reverse effect), the sun, planet carrier and annulus all rotate in unison. This results in the two components of the high regime clutch also rotating at the same speeds as one another and the transmission is said to be operating at synchronous ratio.

It will readily be understood that when this latter condition has been established, the low regime clutch can disengage at the same time as (or after) the high regime clutch engages to effect a regime change with minimal slip, shock or wear.

In high regime operation, the transmission output shaft is driven via a fixed ratio chain from the variator output disc and movement of the variator rollers back towards their highest speed ratio positions will enable the transmission to achieve increasingly higher forward speed ratios right up to deep overdrive.

It will be clear that in these known systems, a synchronous change of regime can only occur at one specific transmission ratio since it is only at this point that the oncoming clutch has no relative motion across its elements and can be engaged without substantial risk of shift shock. This is true whether the change is from low regime to high regime as above discussed, or in the contrary sense. However, as in practice the clutches take a finite time to fill and engage, the fill process must be started correspondingly early if the CVT is to provide a smooth continuously varying transmission ratio.

The strategy currently adopted for this purpose in these systems engages the clutch in two phases.

In the first phase, low pressure fluid is used as the transmission approaches synchronous ratio to 'soft-fill' the clutch to a pressure just capable of overcoming the 'push off' springs and closing the friction plates. The finite oil flow required for this purpose is accessed from the lubrication flow at a point downstream of the system control valves to provide a high volume low pressure flow of fluid to the clutch-actuating pistons. Since the low pressure applied to the clutch is not sufficient to create significant clutch capacity, soft fill can be started at any convenient time provided only that the clutch is full as the transmission reaches synchronous ratio.

In the second phase, once the transmission ratio is within acceptable tolerance of synchronous ratio and the clutch has been soft-filled as above described, the hydraulic supply is switched to 'hard fill' the clutch at a sufficiently higher pressure to fully engage the clutch and move the transmission into high regime operation. This second phase of the process requires very little oil flow and so is rapid with minimum disruption to pressure control.

As already stated above, if the sequence has been judged correctly, a perfect regime shift will result, as it will if the clutch fill process has been completed early because the system can then wait for synchronism. However if the fill is late, as sometimes occurs, then the transmission will have already passed synchronous ratio before any action can be taken thereby creating an almost impossible situation for satisfactory regime change. In these latter circumstances, hard-filling of the clutch will occur at a significant transmission ratio error and this results in a noticeable mechanical shock on the change from one transmission regime to the other.

It is an object of the present invention to reduce and possibly eliminate the problems associated with the above-mentioned arrangement.

Accordingly, the present invention provides a control system for a multi-regime continually-variable-transmission driven by a prime mover and providing an output drive, the control system comprising first and second regime change clutches and means for initiating engagement of the otherwise unengaged clutch during regime change, said control system further including:

first control means, for controlling the clutch apply pressure of one or other of the clutches; and second control means, for controlling the variator rollers, characterised in that the first and second control means are operable independently of each other thereby to achieve active control of the regime change.

Preferably the first and second regime change clutch comprise hydraulically actuated clutches employing absolute pressures in a control circuit and the variator control employs differential pressures within said circuit.

Conveniently, each clutch includes an actively engaged phase obtained by connecting the clutch to a trailing pressure within the circuit and a fully engaged phase obtained by connecting the clutch to a leading pressure within the circuit.

In operation, each clutch is operably connected to and, at least initially, controlled by the lower of the two pressures employed to control the variator.

Preferably, each clutch is operably connected to the higher of the two pressures employed to control the variator subsequent to it having been connected to the lower pressure employed therein: The control system further includes supply means for causing the supply of hydraulic fluid to each clutch to vary between the two pressures within the circuit control.

Advantageously, the control system further includes sequencing means for causing operation and completion of the actively controlled phase prior to the commencement of the fully engaged phase.

Preferably, the control system further includes electronic control means for initiating clutch operation in advance of a range change.

In a particularly advantageous arrangement the control system further includes monitoring means for monitoring at least one property associated with variator operation thereby to determine in advance of the variator reaching synchronous ratio that a change in ratio is necessary and for signalling the electronic control means accordingly.

Preferably, said monitoring means includes one or more monitors for monitoring one or more of: engine speed; variator ratio; time; transmission ratio; clutch fill time and shift rate or rate of change of one or other thereof.

The present invention also provides a multi-regime continually variable-transmission incorporating a control system as described above.

In addition to the above, the present invention also provides a method of operating a control system for a multi-regime continually-variable transmission having first and second regime change clutches, the method comprising the steps of:

firstly, during regime change, initiating engagement of the otherwise unengaged clutch before the variator reaches synchronous ratio such that the engine load created by the transmission varies and thereby induces a change of regime;

secondly, completing regime change by disengaging the clutch associated with the regime from which the transmission has been changed and completing engagement of the clutch under engagement.

Preferably the clutches comprise hydraulically operated clutches and each clutch comprises an actively engaged phase and a fully engaged phase and in which during the active phase the clutch is operably connected to a trailing pressure in a control circuit and during the fully engaged phase the clutch is operably connected to a leading pressure in the control circuit, and the method includes the further step of initiating clutch engagement by firstly connecting the clutch to the trailing pressure and completing engagement by connecting it to the leading pressure.

In a preferred mode the variator includes ratio varying rollers each associated with a respective hydraulic ram the method including the further step of supplying hydraulic fluid to the hydraulic ram such that the rollers respond to the differential pressure.

Advantageously, the method includes the further step of monitoring one or more parameters associated with the control system, transmission, or items associated therewith, thereby to determine when to commence said first and second steps.

In another form of the present invention there is provided a hydraulic control system for a multi-regime continually variable transmission driven by a prime mover and providing an output drive, the transmission having hydraulically actuated first and second regime change clutches and a variator having ratio varying rollers each associated with a respective hydraulic ram, the system having, at any particular moment in time, a higher and a lower source of hydraulic pressure, supply means for causing the supply of hydraulic fluid to each clutch to vary between the fluid at the higher pressure and the fluid at the lower pressure and the supply of hydraulic fluid to the hydraulic ram to be such that the rollers respond to the differential pressure.

Embodiments of the invention will now be described, by way of example only, with reference to the accompanying schematic drawings in which.

Figure 2:
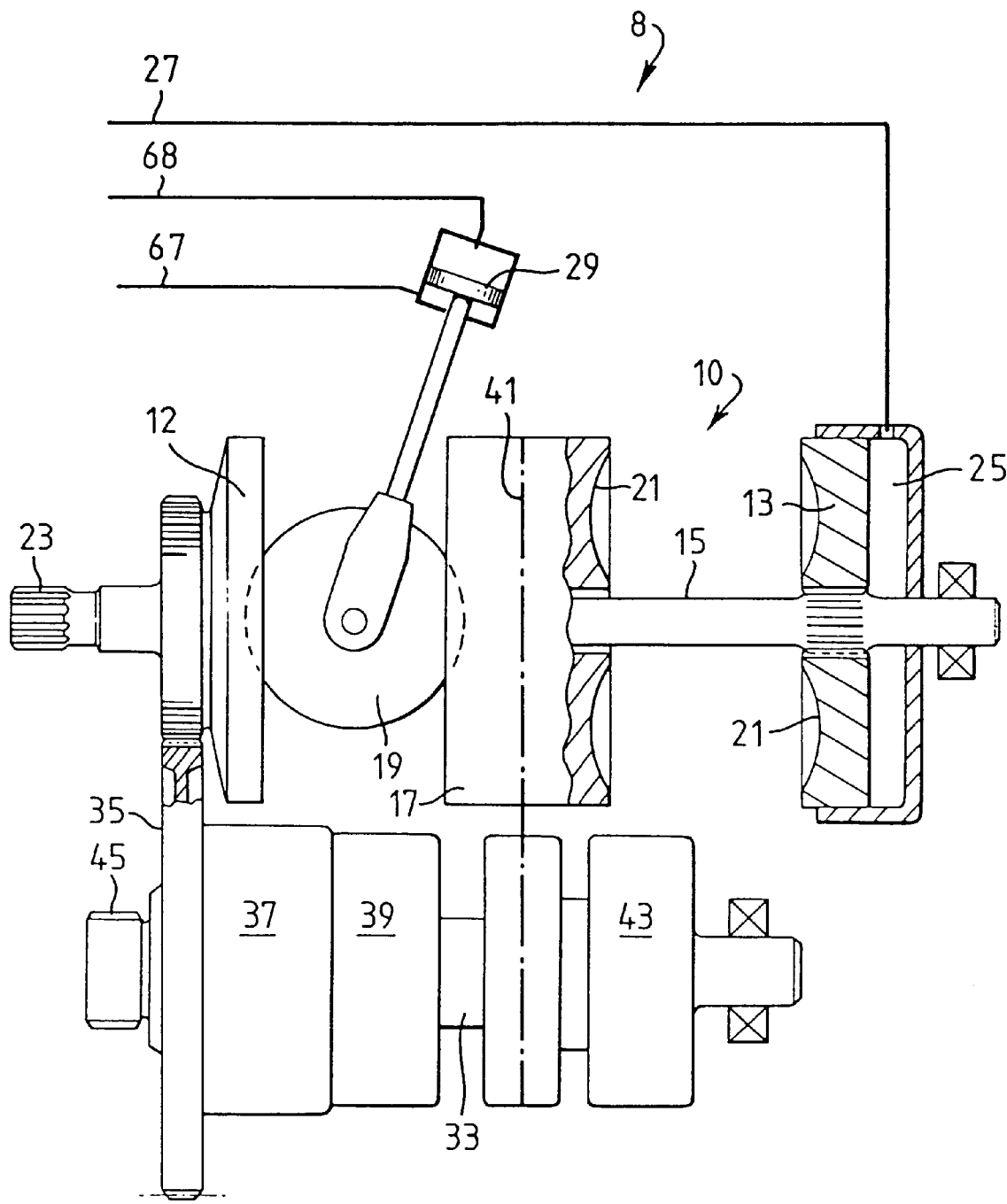
FIG. 2 shows, in outline form only, the CVT to be controlled by the system of FIG. 1.

Referring first to FIG. 2, the CVT 8 shown there includes a variator 10 of the toroidal-race rolling-traction type comprising two input discs 12, 13 (the latter splined to the variator shaft 15 for limited axial movement along the shaft), a central output disc 17, and two arrays of piston-controlled rollers engaging with the input and output discs to transmit torque between the discs in response to the torque demand on the variator. For simplicity, only one of the six rollers, the so-called master roller 19, is shown in FIG. 2.

As is known from GB 2227287, for example, it is important that the roller pistons be aligned so that they are substantially tangential to the centre circle of the imaginary toruses 21 of which the rotor races form part, but with a small inclination known as the "camber" or "caster" angle.

The variator input shaft 15 is powered at one end 23 from the engine (not shown) of the host vehicle while an axial load is imposed on the input disc at the other end of the variator by a pressure chamber 25 filled with high pressure hydraulic fluid from the same line 27. The pressure in line 27 is equal to the greater of the two pressures in lines 67, 68, the higher of which is employed as the control pressure or leading pressure fluid for roller piston 24. The trailing pressure fluid for piston 29 is provided from whichever of lines 67, 68 has the lower pressure. It will therefore be noted that the roller responds to the differential pressure across its control piston rather than to the absolute pressure values in lines 67 and 68.

For high regime operation, e.g. as described in the introductory portions of this application, the transmission output shaft 33 is powered from the variator input shaft via gearing 35, a low regime clutch 37 and an epicyclic gear set 39 in known fashion.

For low regime operation, shaft 33 is additionally powered from the variator output disc 17 via a drive chain 41 and a high regime clutch 43.

Reference numeral 45 indicates the output end of shaft 33, e.g. for connection with the host vehicle's differential and road wheels.

Figure 1:
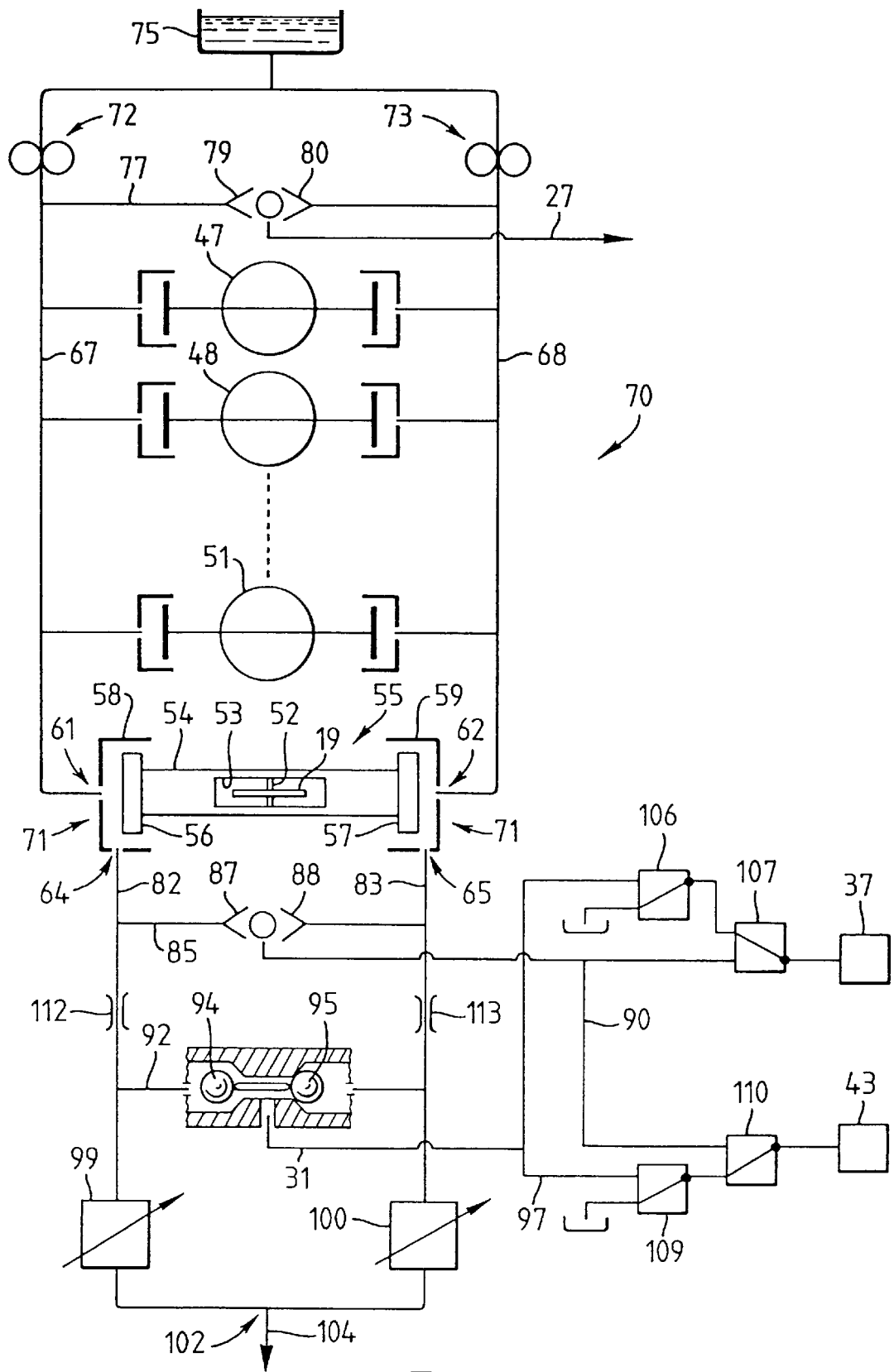
FIG. 1 shows a schematic circuit diagram for a hydraulic control system in accordance with the present invention.

The master roller 19 and the five "slave" rollers 47–51 and their associated control pistons and cylinders appear again in FIG. 1 as do the two regime clutches 37 and 43, both of which are fitted with push-off springs rated to withstand a plate-closing pressure of up to 3 bar.

As will be seen from FIG. 1, the axle 52 of the master roller 19 is mounted in the cavity 53 of the hollow shaft 54 of a double-acting piston 55. This piston is formed with opposed piston heads 56, 57 which are both free to slide under hydraulic load within coaxial cylindrical caps 58, 59 and to rotate about the longitudinal axis of the shaft 54. Together, piston 55 and end caps 58, 59 act to define a hydraulic ram 71 associated with each roller. It will be appreciated that this figure is purely schematic.

In a modification, item 55 is replaced by a single-headed design of double-acting piston e.g. as disclosed, for example, in GB 2227287 and depicted, for convenience only, in the diagrammatic representation of FIG. 2.

Returning to the double-ended arrangement of FIG. 1, the hydraulic fluid inlets 61, 62 and outlets 64, 65 for the master piston are formed in the end and side walls of the associated cylinder caps 58, 59 and pressure lines 67, 68 ensure that the various slave pistons behave in exactly the same way as master piston 29 so that all six variator rollers are continuously maintained at the same pressure as one another.

Turning now to the hydraulic control system 70, this comprises two independent oil pumps 72, 73 delivering hydraulic fluid from a sump 75 to the lines 67, 68 referred to above. A cross-connection 77 between these two lines communicates by way of a 'higher-pressure-wins' arrangement of non-return valves 79 and 80 with the flow line 27 in FIG. 2.

The outlets 64, 65 for the master piston end caps 58, 59 feed left-hand and right-hand pressure lines 82, 83. These are interconnected by a cross-connection 85 which communicates by way of a 'higher-pressure-wins' arrangement 87, 88 with a fully engaged circuit 90 for clutches 37, 43. A second cross-connection 92 communicates by a 'lower-pressure-wins' arrangement 94, 95 with the an actively engaged circuit 97 for the two clutches.

Reference numerals 99, 100 indicate two electro-hydraulic pressure control valves which, in combination, effectively constitute first and second control means for controlling the clutch apply pressure and the variator rollers in a manner discussed in detail later herein.

Downstream of these two valves, the pressure lines 82, 83 combine at 102 from whence a connection 104 provides low-pressure fluid for general lubrication of the transmission.

Turning now to clutch control circuits 90, 97 it will be noted that each contains two electrically-operated solenoid valves 106, 107 and 109, 110 which can be switched to connect each of the clutches 37, 43 for "active-fill" or for "a fully engaged-fill" as required. From the situation illustrated in FIG. 1, for example, switching the valve 106 will connect the low regime clutch 37 to the actively engaged circuit 97 whereas switching the valve 107 instead, will connect the low regime clutch 37 to the fully engaged circuit 90. Valves 109 and 110 operate in analogous fashion to valves 106 and 107 but in respect of the high regime clutch 43.

The system is completed by two 1 bar restrictor plates 112, 113 located in lines 82, 83 between the two cross-connection 85, 92.

In operation of the illustrated embodiment, suppose, by way of example only, that initially clutch 37 is operable and clutch 43 is to be brought into operation in place of clutch 37 to effect a regime change. Then, as compared with the situation illustrated in FIG. 1 (neither clutch operative), solenoid valve 107 will have been switched so as to connect clutch 37 with the fully engaged circuit 90.

Turning now to the pressure control valves 99, 100, in a typical case the pressure control valve 99 initially is receiving zero current and the valve 100 is receiving a ½ amp current. This means that the line pressure immediately upstream of valve 99 will be at roughly back-pressure (2 bar) and the next step is to switch valve 109 to fill the line between the valve 109 and clutch 43 with low pressure oil.

To fill clutch 43 and close the clutch plates in readiness for active control of a regime change, the currents in valves 99, 100 are raised to 0.1 amps and 0.6 amps respectively to increase the adjacent line pressures typically from 2 bar to 3.6 bar (line 82) and from 10 bar to 11.6 bar (line 83). The pressure in line 82 is now sufficient to fill the high-regime clutch 43 at a rate determined by the control current for valves 99, 100. After a set time, typically ½ second, say, the control electronics, shown schematically at 220 in FIG. 3, will assume that this phase has been completed and the system is held in readiness for the next phase. This latter phase is commenced when the control electronics increase the control valve currents at 99, 100 to 1 amp and 1.5 amps respectively, raising the adjacent line pressures to 18 bar (line 82) and 26 bar (line 83). The pressure in line 82 is now sufficient to cause the high-regime clutch to generate capacity and this moves the transmission to the synchronous ratio. The initial part of the regime-change process is completed when the control electronics measures the transmission ratio to be synchronous.

It is to be noted that in all the situations discussed above, the operating currents for the two pressure control valves are increased by exactly the same amounts so that the difference in pressure between the two lines 82, 83 remains at 8 bar. This means that the roller control piston settings in the variator are unaffected by what is happening at the regime clutches.

As already described in an earlier portion of this application, bringing both the regime-shift clutches into full operation ensures that the transmission is operating at synchronous ratio and it is at this point that the control electronics has to 'decide' from the information it is receiving about the transmission, the engine speed and the throttle pedal setting whether to return the transmission to low regime operation or to switch over to high regime operation. A decision to return to low regime operation will simply involve reversing each of the steps discussed above (at all times maintaining the 8 bar pressure difference between lines 82, 83). It should be noted, however, that if the decision is to change the transmission from one regime to the other, then, when this change of regime occurs, the operating characteristics of the variator will be reversed so that what was the control pressure side of the roller control piston will now be the trailing pressure side and vice versa. This change requires that at the cross-over point of the variator's operational cycle, the "control" and "trailing" pressures lie temporarily at one and the same value.

Thus, if it is confirmed that a change of regime is still appropriate, by maintaining clutch 43 engaged and disengaging clutch 37, the first necessary step is that the valve currents are both raised to a same value, typically 2 amps, so as temporarily to 'cut out' the variator 10 from the transmission before switching valves 106, 107 to the positions illustrated in FIG. 1 to disengage clutch 37. Prior to the subsequent release of clutch 37, the current in valve 100 is reduced to zero amps (2 bar) while that in valve 99 is reduced to ½ amp (10 bar) so as to preset the pressure differential across the variator to that required for operation in the next regime. Further regime changes at either clutch will be carried out in an analogous fashion to those described above.

It is to be noted that when the valves 99, 100 have zero control current and the pressure differential across the variator is zero, the presence of restrictor plates 112, 113 (or their functional equivalent) is important as they act to ensure a one bar pressure difference between the two fill lines 90, 97. This means that what is at the time the fully engaged clutch can be retained at a sufficiently high pressure to maintain the clutch engaged while what is at the time the actively engaged clutch can be maintained at a pressure sufficient to prevent the clutch plates from closing against the opposing action of the clutch push-off spring. It is further to be noted that in the event of an emergency overload situation, the pressure peaks occurring as a result of the hydraulic end-stop effect in the relevant cylinder cap 58, 59 will be passed on by lines 67, 68 to the other control cylinders and to the variator end load chamber 25. However, as this momentary peaking will not occur in the downstream lines 82, 83 controlling the regime clutches, these latter will remain unaffected and can slip, if necessary, to relieve the excess load on the variator.

Figure 3:
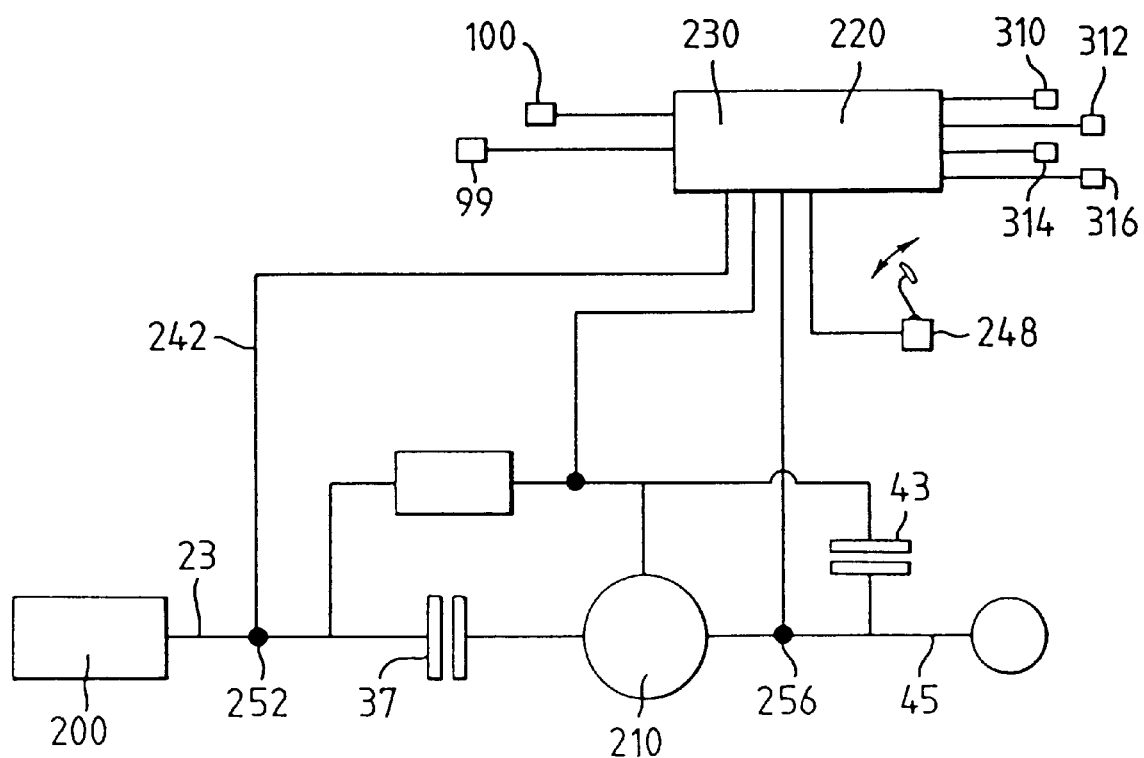
FIG. 3 is a schematic representation of a drive system incorporating aspects of the present invention.

FIG. 3 is a schematic representation of the present invention when combined with a conventional powertrain layout.

From this and the introductory portion of the specification, it will be appreciated that power can be transmitted from the prime mover (engine) 200 to the output shaft 45 via the epicyclic 210 and the variator 10 of the variator on its own. In low regime clutch 37 is engaged whilst in high regime clutch 43 is engaged. Whilst actual operation of these clutches has been discussed above, optimum control thereof is best achieved by employing some form of control in the form of, for example, electronic control means 220. Such a control 220 comprises means 230 for monitoring any one or more of a number of properties associated with variator operation thereby to determine in advance of the variator reaching synchronous ratio that a change in ratio is necessary and for signalling the electronic control means 220 accordingly. Suitable monitors or measuring devices are well known in the art and are, therefore, not described herein. Parameters such as engine speed; variator ratio; time; transmission ratio; clutch fill time; shift rate; throttle pedal position; hydraulic pressure or rate of change of one or other thereof are all suitable candidates for monitoring.

In the examples of FIG. 3, lines 242, 244 and 246 each represent links between suitable monitors 252, 254 and 256 positioned for monitoring the engine speed, variator output speed and epicyclic output speed and for supplying information relating thereto to control 220. Additionally, FIG. 3 shows a pedal position monitor of 248 and similarly connected to control 220.

Figure 4:
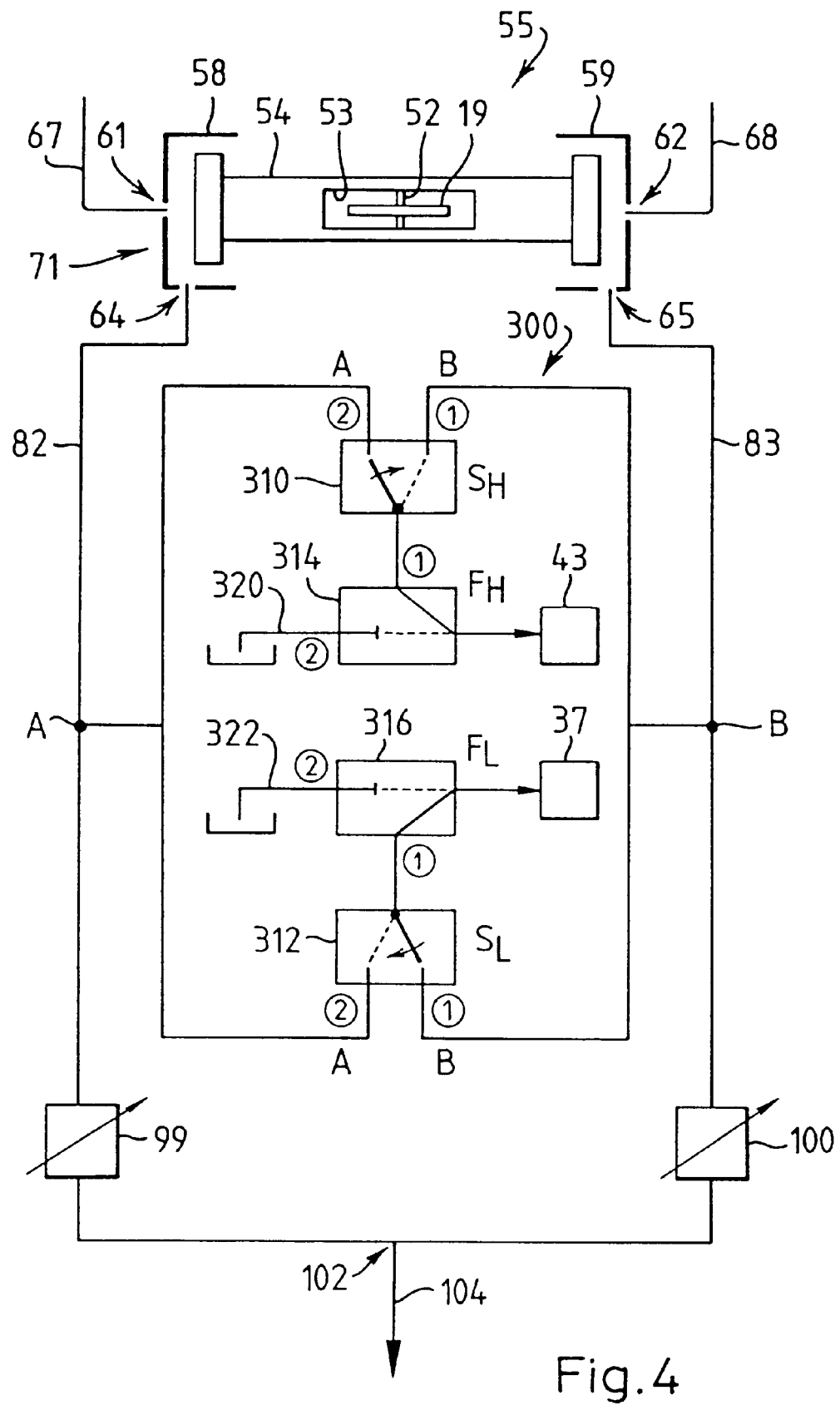
FIG. 4 is a simplified version of the control system illustrated in the bottom half of FIG. 1.

Turning now to FIG. 4 which illustrates a slightly simplified version of the control shown in FIG. 2, it will be appreciated that various arrangements are possible. In this simplified version, lines 82, 83 are connected to the clutch control circuit 300 at points A and B respectively. Control valves 99, 100 are connected to lines 82, 83 in the same manner as described with reference to FIG. 1. The valves continue to supply fluid to the lubrication circuit 104 and vary the pressures in the roller control rams 71. The control system 300 comprise four solenoid actuated valves 310, 312, 314 and 316. The first two valves are operable to take hydraulic fluid from one or other of A or B and pass that fluid onto associated secondary valves 314, 316 respectively. These secondary valves are operable in similar manner to direct hydraulic fluid to a respective clutch 37, 43. This arrangement of valves is functionally very similar to that shown in FIG. 1. As mentioned with reference to FIG. 1, the control electronics are also operably connected to valves 99, 100 for varying the position thereof and hence varying $P_a$ and $P_b$. Consequently, the control electronics can easily determine which is the greater of the two pressures within the circuit and cause the system to be operated accordingly. For example, whilst operating in drive forwards, the high pressure line is determined by the regime i.e. Low Regime could require the left line, High Regime the right. In over run and reverse drive the pressures reverse. Since the controller causes changes in the pressures within lines 82, 83 it can also change the clutch valve to connect the clutch to the correct line.

Operation of the FIG. 4 arrangement from the low regime to the high regime follows the following sequence of events:

Firstly, assuming the low range clutch 37 is presently engaged, and the pressure at B is greater than the pressure at A, valve 312 is in position 1 (line B) as is valve 316, thereby to supply high pressure fluid to maintain operation of low range clutch 37. When clutch 37 is engaged, valve 314 is in position 2 thus preventing the supply of any hydraulic fluid to the clutch and allowing any fluid in there from previous operation to drain via outlet 320 to sump 104.

In order to move from low range to high range it is necessary to initiate operation of valves 310 and 314 such as to direct low pressure fluid from A to the clutch. This is simply achieved by switching valve 310 to position 2 and valve 314 to position 1. During this phase of operation the pressure at B ($P_B$) is greater than that at A ($P_A$) and, hence, the high clutch is said to be in the initial stage of active control phase. During this part of the phase, the low pressure fluid acts to close the clutch but provides insufficient presure to give the clutch capacity i.e. clamp the clutch plates and allow transmission of torque. Completion of this part of the phase can be determined by monitoring the time elapsed since commencement or monitoring other parameters in the system such as clutch position. At this point in time, the ratio of the variator $R_{VAR}$ is not matched to that necessary for synchronism $R_{SYNCH}$ and $P_A$ is clearly less than that required to fully engage the clutch ($P_{CLAMP}$) and allow for the transmission of torque.

In order to move the arrangement to synchronism it is necessary to increase $P_A$ in order to allow the clutch to transmit torque. This step is achieved by operating valves 99, 100 in the manner described in relation to FIG. 1 such that $P_A$ is increased without altering the value of $P_B-P_A$. In effect, valves 99, 100 are operated together to raise the pressures in both lines 82, 83 by equal amounts until $P_A$ is sufficient to cause a drag torque capable of moving the variator to synchronous ratio. At this point the clutch loads the transmission and a certain degree of clutch slip might occur. The final step in this phase involves controlling $P_a$ and $P_b-P_a$ such that the system moves to synchronism and the engaging clutch stops slipping. This is simply achieved by altering the current supplied to valves 99, 100 in the manner described above such that the engaging clutch causes a variation in engine speed such that it matches that required for synchronous operation. In effect, the engine load created by the transmission varies inducing the shift. Once the clutch has stopped slipping, the transmission is at synchronous ratio. If the engine is still producing torque, as is probable, the clutches must be maintained with enough pressure applied for their combined capacity to match the engine drive torque. Increasing both lines 82, 83 to equal pressures will cause the transmission to maintain synchronous ratio against the engine drive whilst unloading the variator (differential pressure=0). Whilst in this condition the transmission ratio and therefore roller angles are constant, i.e. synchronised. Dropping the pressure in the low pressure line of the next regime then sets the variator up with the correct differential pressure and reduces the unwanted clutch capacity appropriately. Eventually, this clutch slips and then releases leaving the transmission in the next regime. If desirable, one might initiate complete final release of the outgoing clutch before the oncoming clutch is fully engaged. Release of clutch 37 is achieved by switching valve 316 to position 2 such that the hydraulic fluid drains via line 322.

From the above it will be appreciated that the controller 220 decides upon an appropriate variator reaction torque therefore differential pressure ($P_b-P_a$). If the transmission is approaching synchronous ratio as a result of $P_b-P_a$ and the controller decides to initiate an induced shift, the next clutch will be connected to the low pressure line and its capacity controlled accordingly. Taking $P_b$ as the low pressure line and assuming a differential pressure ($P_b-P_a$) of 10 bar is required then initially $P_b=0$ and $P_a=10$ bar. If the controller decides that the drivers demand is best suited to a clutch capacity equivalent to a clutch apply pressure of 3 bar then $P_a$ and $P_b$ will be progressively increased to $P_b=3$ bar and $P_a=13$ bar. Now the variator torques are unchanged but the clutch is urging the transmission to synchronism. There has, however, been an increase in the "urging force" due to the clutch. It is possible that the controller, at least in some situations, may require no net change in this movement to synchronism. Since, the total transmission effect could be regarded as the sum of the variator and clutch action, reducing the variator effect could be made to compensate for the extra clutch action. Simplistically, the variator differential could be reduced by 3 bar giving $P_b=3$ bar and $P_a=10$ bar (assuming the effect of 3 bar at the clutch is exactly compensated by 3 bar less differential pressure at the variator).

It will be appreciated from the above that valves 99, 100 constitute the first control means when operated together to simply raise or lower the pressure of the hydraulic fluid for end load purposes without altering the differential pressure used for roller control. These valves constitute the second control means when operated to vary the differential pressure experienced by the roller control pistons 55.

I claim:

1. A multi-regime continuously-variable transmission including variator rollers and first and second regime clutches (37, 43), said transmission being driven by a prime mover and providing an output drive, first control means controlling a clutch apply pressure supplied to the clutches so as to initiate engagement and disengagement thereof during regime change, and second control means controlling the position of the variator rollers, characterized in that, said first and second control means are operable independently of each other in such a way that the settings of the variator rollers are unaffected by the variations in the clutch apply pressures.

2. The multi-regime continuously-variable transmission as claimed in claim 1 in which the first and second regime change clutches comprise hydraulically actuated clutches employing absolute pressures in a control circuit and variator control employs differential pressures within said circuit.

3. The multi-regime continuously-variable transmission as claimed in claim 1 in which each clutch includes an actively engaged phase obtained by connecting the clutch to a trailing pressure within the circuit and fully engaged phase obtained by connecting the clutch to a leading pressure within the circuit.

4. The multi-regime continuously-variable transmission as claimed in claim 2 in which each clutch is operably connected to and, at least initially, controlled by the lower of the two pressures employed to control the variator.

5. The multi-regime continuously-variable transmission as claimed in claim 4 in which each clutch is operably connected to the higher of the two pressures employed to control the variator subsequent to it having been connected to the lower pressure employed therein.

6. The multi-regime continuously-variable transmission as claimed in claim 3 further including supply means for causing the supply of hydraulic fluid to each clutch to vary between the two pressures within the control circuit.

7. The multi-regime continuously-variable transmission as claimed in claim 3 further including sequencing means for causing operation and completion of the actively controlled phase prior to commencement of the fully engaged phase.

8. The multi-regime continuously-variable transmission as claimed in claim 2 further including electronic control means for initiating clutch operation in advance of a range change.

9. The multi-regime continuously-variable transmission as claimed in claim 2 further including monitoring means for monitoring at least one property associated with variator operation thereby to determine in advance of the variator reaching synchronous ratio that a change in ratio is necessary and for signaling the electronic control means accordingly.

10. The multi-regime continuously-variable transmission as claimed in claim 9 in which said monitoring means includes one or more monitors for monitoring one or more of: engine speed; variator ratio; time; transmission ratio; clutch fill time and shift rate or rate of change of one or other thereof.

11. A method of operating a control system for a multi-regime continually-variable transmission including variator rollers and first and second regime clutches (37, 43), said transmission being driven by a prime mover and providing an output drive, first control means controlling a clutch apply pressure supplied to the clutches so as to initiate engagement and disengagement thereof during regime change, and second control means controlling the position of the variator rollers, characterized in that, said first and second control means are operable independently of each other in such a way that the settings of the variator rollers are unaffected by the variations in the clutch apply pressures, the method comprising the steps of:

firstly, during regime change, initiating engagement of the of the otherwise unengaged clutch before the variator reaches synchronous ratio such that the engine load created by the transmission varies and thereby induces a change of regime;

secondly, completing a regime change by disengaging the clutch associated with the regime from which the transmission has been changed and completing engagement of the clutch under engagement.

12. A method as claimed in claim 11 and wherein the clutches comprise hydraulically operated clutches and each clutch comprises an actively engaged phase and a fully engaged phase and in which during the active phase the clutch is operably connected to the trailing pressure in a control circuit and during the fully engaged phase the clutch is operably connected to a leading pressure in the control circuit, the method including the step of initiating clutch engagement by firstly connecting the clutch to the trailing pressure and completing engagement by connecting it to the leading pressure in the control circuit.

13. A method as claimed in claim 11 and in which the variator includes ratio varying rollers each associated with a respective hydraulic ram the method including the further step of supplying hydraulic fluid to the hydraulic ram such that the rollers respond to the differential pressure withing the control circuit.

14. A method as claimed in claim 11 including the further step of monitoring one or more parameters associated with the control system, transmission, or items associated therewith, thereby to determine when to commence said first and second steps.

15. A hydraulic control system for a multi-regime continually variable transmission driven by a prime mover and providing an output drive, the transmission having hydraulically actuated first and second regime change clutches and variator having ratio varying rollers each associated with a respective hydraulic ram, the system having, at any particular moment in time, a higher and lower source of hydraulic pressure, supply means for causing the supply of hydraulic fluid to each clutch to vary between the fluid at the higher pressure and the fluid at the lower pressure and the supply of hydraulic fluid to the hydraulic ram to be such that the rollers respond to the differential pressure.

* * * * *